(12) United States Patent
Martin et al.

(10) Patent No.: US 11,478,853 B2
(45) Date of Patent: Oct. 25, 2022

(54) METHOD FOR EMISSIONS PLUME MONITORING IN ADDITIVE MANUFACTURING

(71) Applicant: General Electric Company, Schenectady, NY (US)

(72) Inventors: Andrew J. Martin, Blue Ash, OH (US); Mackenzie Ryan Redding, Mason, OH (US); Justin Mamrak, Loveland, OH (US)

(73) Assignee: General Electric Company, Schenectady, NY (US)

( * ) Notice: Subject to any disclaimer, the term of this patent is extended or adjusted under 35 U.S.C. 154(b) by 1448 days.

(21) Appl. No.: 15/390,089

(22) Filed: Dec. 23, 2016

(65) Prior Publication Data

US 2018/0178286 A1 Jun. 28, 2018

(51) Int. Cl.
| | |
|---|---|
| *B22F 3/105* | (2006.01) |
| *B33Y 10/00* | (2015.01) |
| *B33Y 50/02* | (2015.01) |
| *B23K 26/342* | (2014.01) |
| *B23K 26/70* | (2014.01) |
| *B23K 26/042* | (2014.01) |
| *B22F 10/20* | (2021.01) |
| *B23K 15/00* | (2006.01) |
| *B29C 64/371* | (2017.01) |
| *B23K 26/06* | (2014.01) |
| *B23K 26/14* | (2014.01) |
| *B23K 26/082* | (2014.01) |
| *B23K 26/03* | (2006.01) |
| *B23K 26/12* | (2014.01) |
| *B23K 26/00* | (2014.01) |
| *B29C 64/393* | (2017.01) |
| *B29C 64/153* | (2017.01) |
| *B22F 10/30* | (2021.01) |

(52) U.S. Cl.
CPC .......... *B22F 10/20* (2021.01); *B23K 15/0086* (2013.01); *B23K 15/0093* (2013.01); *B23K 26/0006* (2013.01); *B23K 26/03* (2013.01); *B23K 26/042* (2015.10); *B23K 26/0604* (2013.01); *B23K 26/0643* (2013.01); *B23K 26/082* (2015.10); *B23K 26/127* (2013.01); *B23K 26/14* (2013.01); *B23K 26/342* (2015.10); *B23K 26/70* (2015.10); *B29C 64/153* (2017.08); *B29C 64/371* (2017.08); *B29C 64/393* (2017.08); *B33Y 10/00* (2014.12); *B33Y 50/02* (2014.12); *B22F 10/30* (2021.01); *B22F 2203/03* (2013.01); *B22F 2998/10* (2013.01); *B22F 2999/00* (2013.01); *Y02P 10/25* (2015.11)

(58) Field of Classification Search
None
See application file for complete search history.

(56) References Cited

U.S. PATENT DOCUMENTS

| | | | |
|---|---|---|---|
| 5,669,979 | A | 9/1997 | Elliot et al. |
| 7,105,205 | B2 | 9/2006 | Clayton et al. |
| 8,330,957 | B2 | 12/2012 | Hager |
| 8,404,998 | B2 | 3/2013 | Unrath et al. |
| 8,723,078 | B2 | 5/2014 | Mazumdar et al. |
| 8,797,531 | B2 | 8/2014 | Knox et al. |
| 9,132,585 | B2 | 9/2015 | Miller et al. |
| 2011/0174786 | A1 | 7/2011 | Lefebvre et al. |
| 2015/0198052 | A1 | 7/2015 | Pavlov et al. |
| 2016/0114432 | A1 | 4/2016 | Ferrar et al. |
| 2016/0214907 | A1 | 7/2016 | Shim et al. |
| 2016/0236279 | A1 | 8/2016 | Ashton et al. |
| 2016/0250714 | A1 | 9/2016 | Zhang et al. |
| 2018/0126650 | A1* | 5/2018 | Murphree ............ B29C 64/245 |

OTHER PUBLICATIONS

Nassar, A.R., et al., "Process monitoring of directed-energy deposition of inconel-718 via plume imaging," Proceedings of the Solid Freeform Fabrication Symposium, pp. 284-294 (Aug. 12, 2015).
International Search Report and Written Opinion issued in connection with corresponding PCT Application No. PCT/US2017/64957 dated Mar. 22, 2018.

* cited by examiner

*Primary Examiner* — Anthony M Liang
(74) *Attorney, Agent, or Firm* — Dority & Manning, P.A.

(57) ABSTRACT

A method of monitoring an additive manufacturing process in which one or more energy beams are used to selectively fuse a powder to form a workpiece, in the presence of one or more plumes generated by interaction of the one or more energy beams with the powder. The method includes using at least one sensor to generate at least one signal representative of a trajectory of one or more of the plumes.

17 Claims, 5 Drawing Sheets

METHOD FOR EMISSIONS PLUME MONITORING IN ADDITIVE MANUFACTURING

BACKGROUND OF THE INVENTION

This invention relates generally to additive manufacturing, and more particularly to apparatus and methods for monitoring an emissions plume in additive manufacturing.

Additive manufacturing is a process in which material is built up layer-by-layer to form a component. Additive manufacturing is also referred to by terms such as "layered manufacturing," "reverse machining," "direct metal laser melting" (DMLM), and "3-D printing". Such terms are treated as synonyms for purposes of the present invention.

One type of additive manufacturing machine is referred to as a "powder bed" machine and includes a build chamber that encloses a mass of powder which is selectively fused by a radiant energy beam to form a workpiece. The build chamber is enclosed in a housing that typically includes provisions for a flow of shielding gas therein. The shielding gas is used to transfer heat away from the surface of the powder bed, to prevent vaporized powder from condensing on the surface of the workpiece, and to control undesired chemical reactions, such as oxidation.

In operation, the interaction of the radiant energy beam with the powder causes vaporization of the powder, generating a plume which originates in the vicinity of the melt pool and travels downstream, entrained in the shielding gas flow. In the immediate vicinity of a melt pool generated by the energy beam, the composition of the plume is mostly vaporized powder. At downstream locations, the vapor cools and condenses so that the plume comprises a mixture of gas and metallic particles (condensate).

The presence of the condensate can have detrimental effects on the build process, for example blockage of the energy beam, or a reduction in beam intensity. This effect can prevent rapid beam scanning or the use of multiple beams.

A problem with prior art additive manufacturing machines and processes is that the trajectory of the emissions plume is not tracked or known.

BRIEF DESCRIPTION OF THE INVENTION this problem is addressed by a method of using one or more sensors to provide a real-time understanding of the emissions plume trajectories in an additive manufacturing process.

According to one aspect of the technology described herein, a method is provided of monitoring an additive manufacturing process in which one or more energy beams are used to selectively fuse a powder to form a workpiece, in the presence of one or more plumes generated by interaction of the one or more energy beams with the powder. The method includes using at least one sensor to generate at least one signal representative of a trajectory of one or more of the plumes.

According to another aspect of the technology described herein, a method of making a workpiece includes: depositing a powdered material in a build chamber disposed in a housing, while using a gas flow apparatus coupled in fluid communication with the housing to provide a gas flow over the powder; in the presence of the gas flow, directing one or more energy beams to selectively fuse the powdered material in a pattern corresponding to a cross-sectional layer of the workpiece, wherein interaction of the one or more energy beams with the powdered material generates one or more plumes entrained in the gas flow; using at least one sensor to generate at least one signal representative of a trajectory of one or more of the plumes; and controlling at least one aspect of the additive manufacturing process in response to the at least one signal.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
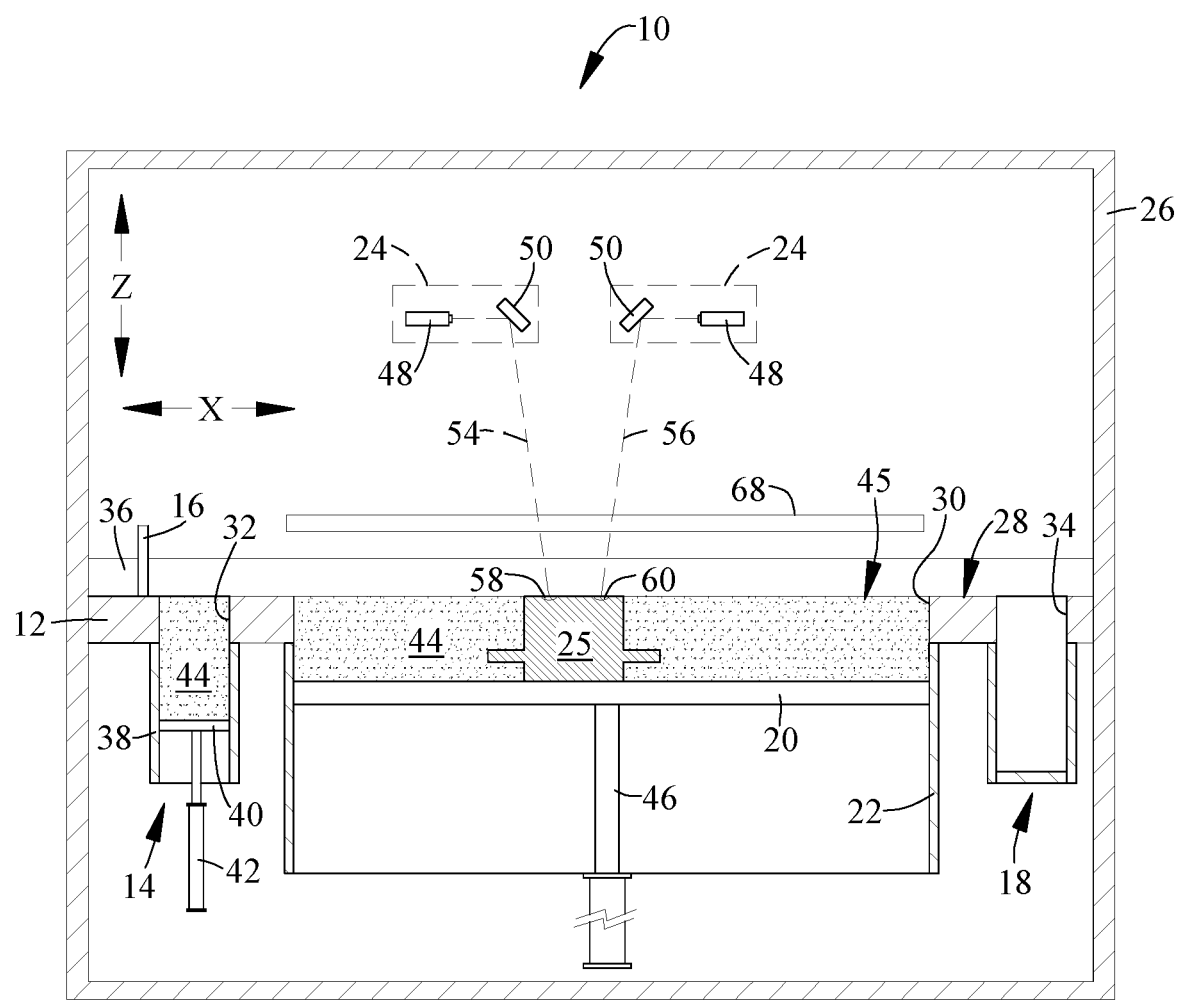
FIG. 1 is a schematic, partially-sectioned front elevation view of an exemplary additive manufacturing machine including a build chamber therein.

Referring to the drawings wherein identical reference numerals denote the same elements throughout the various views, FIG. 1 illustrates schematically an additive manufacturing machine 10 suitable for carrying out an additive manufacturing method. Basic components of the machine 10 include a table 12, a powder supply 14, a recoater 16, an overflow container 18, a build platform 20 surrounded by a build chamber 22, and at least one beam generator 24, all surrounded by a housing 26. Each of these components will be described in more detail below.

The table 12 is a rigid structure defining a planar worksurface 28. The worksurface 28 is coplanar with and defines a virtual workplane. In the illustrated example it includes a build opening 30 communicating with the build chamber 22 and exposing the build platform 20, a supply opening 32 communicating with the powder supply 14, and an overflow opening 34 communicating with the overflow container 18.

The recoater 16 is a rigid, laterally-elongated structure that lies on the worksurface 28. It is connected to an actuator 36 operable to selectively move the recoater 16 along the worksurface 28. The actuator 36 is depicted schematically in FIG. 1, with the understanding devices such as pneumatic or hydraulic cylinders, ballscrew or linear electric actuators, and so forth, may be used for this purpose.

The powder supply 14 comprises a supply container 38 underlying and communicating with the supply opening 32, and an elevator 40. The elevator 40 is a plate-like structure that is vertically slidable within the supply container 38. It is connected to an actuator 42 operable to selectively move the elevator 40 up or down. The actuator 42 is depicted schematically in FIG. 1, with the understanding that devices such as pneumatic or hydraulic cylinders, ballscrew or linear electric actuators, and so forth, may be used for this purpose. When the elevator 40 is lowered, a supply of powder 44 of a desired composition (for example, metallic, polymeric, ceramic, and/or organic powder) may be loaded into the supply container 38. When the elevator 40 is raised, it exposes the powder 44 above the worksurface 28. Other types of powder supplies may be used; for example powder may be dropped into the build chamber 22 by an overhead device (not shown).

The build platform 20 is a plate-like structure that is vertically slidable below the build opening 30. It is connected to an actuator 46 operable to selectively move the build platform 20 up or down. The actuator 46 is depicted schematically in FIG. 1, with the understanding that devices such as pneumatic or hydraulic cylinders, ballscrew or linear electric actuators, and so forth, may be used for this purpose. When the build platform 20 is lowered into the build chamber 22 during a build process, the build chamber 22 and the build platform 20 collectively surround and support a mass of powder 44 along with any components being built. This mass of powder is generally referred to as a "powder bed", and this specific category of additive manufacturing process may be referred to as a "powder bed process".

The overflow container 18 underlies and communicates with the overflow opening 34, and serves as a repository for excess powder 44.

The apparatus 10 incorporates at least one beam generator 24 operable to generate an energy beam and direct it as desired. As will be explained in more detail below, multiple beam generators 24 may be provided and used simultaneously in order to increase this production speed of the apparatus 10. In the illustrated example, two beam generators 24 are shown.

Each beam generator 24 includes a directed energy source 48 and a beam steering apparatus 50. The directed energy source 48 may comprise any device operable to generate a beam of suitable power and other operating characteristics to melt and fuse the powder 44 during the build process, described in more detail below. For example, the directed energy source 48 may be a laser. Other directed-energy sources such as electron beam guns are suitable alternatives to a laser.

The beam steering apparatus 50 may include one or more mirrors, prisms, and/or lenses and provided with suitable actuators, and arranged so that a beam from the directed energy source 48 can be focused to a desired spot size and steered to a desired position in plane coincident with the worksurface 28. For purposes of convenient description, this plane may be referred to as a X-Y plane, and a direction perpendicular to the X-Y plane is denoted as a Z-direction (X, Y, and Z being three mutually perpendicular directions). The beam may be referred to herein as a "build beam".

In the illustrated example, one of the beam generators 24 is operable to generate a first build beam 54, and the other of the beam generators 24 is operable to generate a second build beam 56.

An exemplary basic build process for a workpiece 25 using the apparatus described above is as follows. The build platform 20 is moved to an initial high position. The build platform 20 is lowered below the worksurface 28 by a selected layer increment. The layer increment affects the speed of the additive manufacturing process and the resolution of the workpiece 25. As an example, the layer increment may be about 10 to 50 micrometers (0.0003 to 0.002 in.). Powder 44 is then deposited over the build platform 20 for example, the elevator 40 of the supply container 38 may be raised to push powder through the supply opening 32, exposing it above the worksurface 28. The recoater 16 is moved across the worksurface to spread the raised powder 44 horizontally over the build platform 20. Any excess powder 44 drops through the overflow opening 34 into the overflow container 18 as the recoater 16 passes from left to right. Subsequently, the recoater 16 may be moved back to a starting position. The leveled powder 44 may be referred to as a "build layer" and the exposed upper surface thereof may be referred to as a "build surface", designated 45.

One or more of the beam generators 24 are used to melt a two-dimensional cross-section or layer of the workpiece 25 being built. Within the beam generator 24, the directed energy source 48 emits a beam and the beam steering apparatus 50 is used to steer a focal spot of the build beam over the exposed powder surface in an appropriate pattern. A small portion of exposed layer of the powder 44 surrounding the focal spot, referred to herein as a "melt pool" is heated by the build beam to a temperature allowing it to sinter or melt, flow, and consolidate. This step may be referred to as "fusing" the powder 44. As an example, the melt pool may be on the order of 100 micrometers (0.004 in.) wide. In the illustrated example using two beam generators 24, the first build beam 54 generates a first melt pool 58 and the second build beam 56 generates a second melt pool 60.

The build platform 20 is moved vertically downward by the layer increment, and another layer of powder 44 is applied in a similar thickness. The beam generators 24 again emit build beams 54, 56 and the beam steering apparatus 50 is used to steer the focal spots of the build beams 54, 56 over the exposed powder surface in an appropriate pattern. The exposed layer of the powder 44 is heated by the build beams 54, 56 to a temperature allowing it to fuse as described above, and consolidate both within the top layer and with the lower, previously-solidified layer.

This cycle of moving the build platform 20, applying powder 44, and then directed energy fusing the powder 44 is repeated until the entire workpiece 25 is complete.

The machine 10 and its operation are as representative example of a "powder bed machine". It will be understood that the principles described here are applicable to other configurations of powder bed machines.

Figure 2:
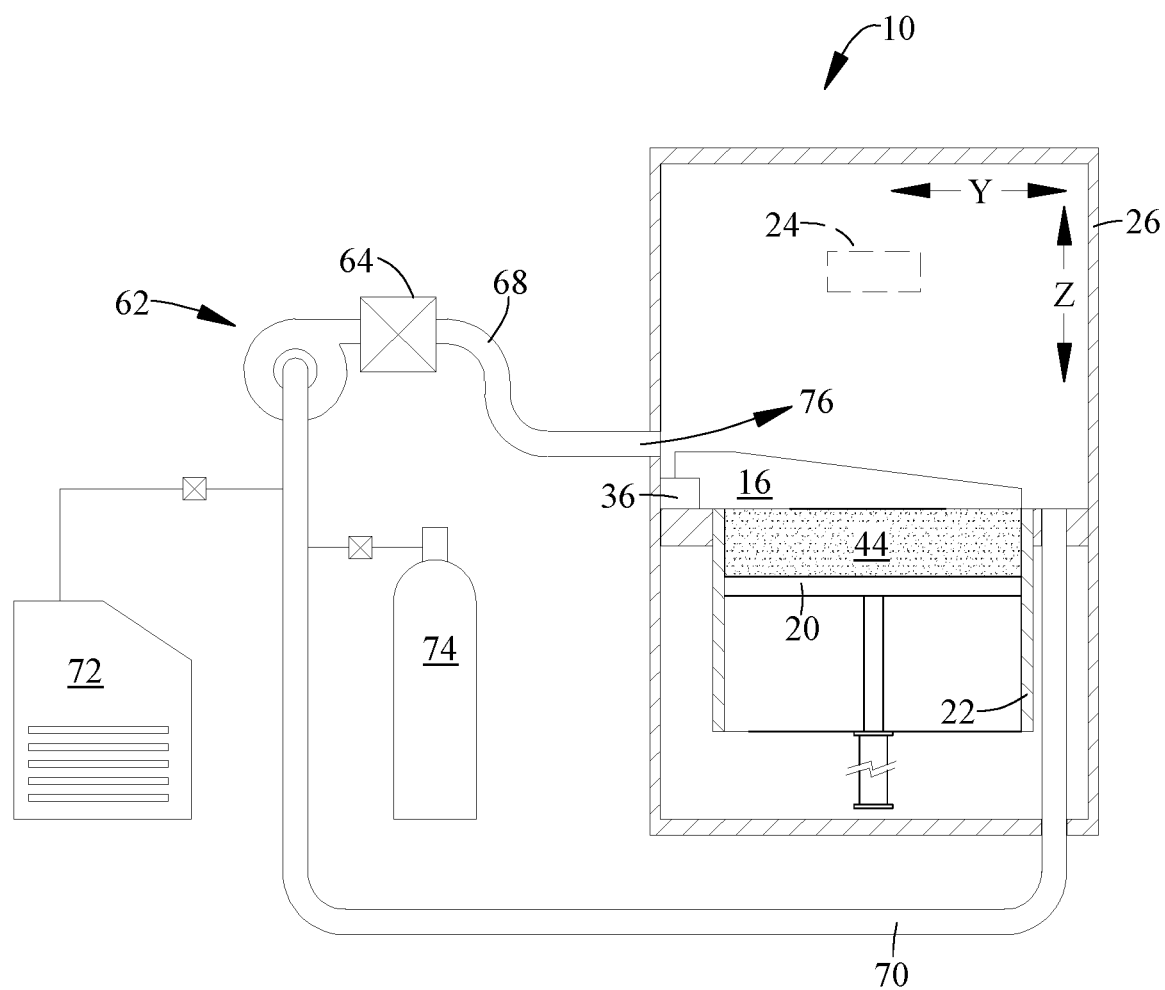
FIG. 2 is a schematic, partially-sectioned side elevation view of the machine of FIG. 1.

The housing 26 serves to isolate and protect the other components of the machine 10. During the build process described above, the housing 26 is provided with a flow of an appropriate shielding gas which, among other functions, excludes oxygen from the build environment. To provide this flow the machine 10 may be coupled to a gas flow apparatus 62, seen in FIG. 2. The exemplary gas flow apparatus 62 includes, in serial fluid flow communication, a variable-speed fan 64, a filter 66, an inlet duct 68 communicating with the housing 26, and a return duct 70 communicating with the housing 26. All of the components of the gas flow apparatus 62 are interconnected with suitable ducting and define a gas flow circuit in combination with the housing 26.

The composition of the gas used may similar to that used as shielding gas for conventional welding operations. For example, gases such as nitrogen, argon, or mixtures thereof may be used. Any convenient source of gas may be used. For example, if the gas is nitrogen, a conventional nitrogen generator 72 may be connected to the gas flow apparatus 62. Alternatively, the gas could be supplied using one or more pressurized cylinders 74.

Once the gas flow apparatus 62 and machine 10 are initially purged with gas, the fan 64 is used to recirculate the gas through the gas flow circuit in a substantially closed loop, so as to maintain the positive pressure described above, with additional added makeup gas added as needed. Increasing the fan speed increases the velocity and flow rate of gas in the gas flow circuit; conversely, decreasing the fan speed decreases the velocity and flow rate of gas in the gas flow circuit. As an alternative to recirculation, the gas flow apparatus 62 could operate in a total loss mode; for example instead of the gas flowing through the return duct 70 and back to the fan 64, it could simply be vented to atmosphere after passing over the build chamber 22. In the illustrated example, the thermal mass of the gas provides a heat transfer function, however an optional heat exchanger (not shown) could be incorporated into the gas flow apparatus 62.

Figure 3:
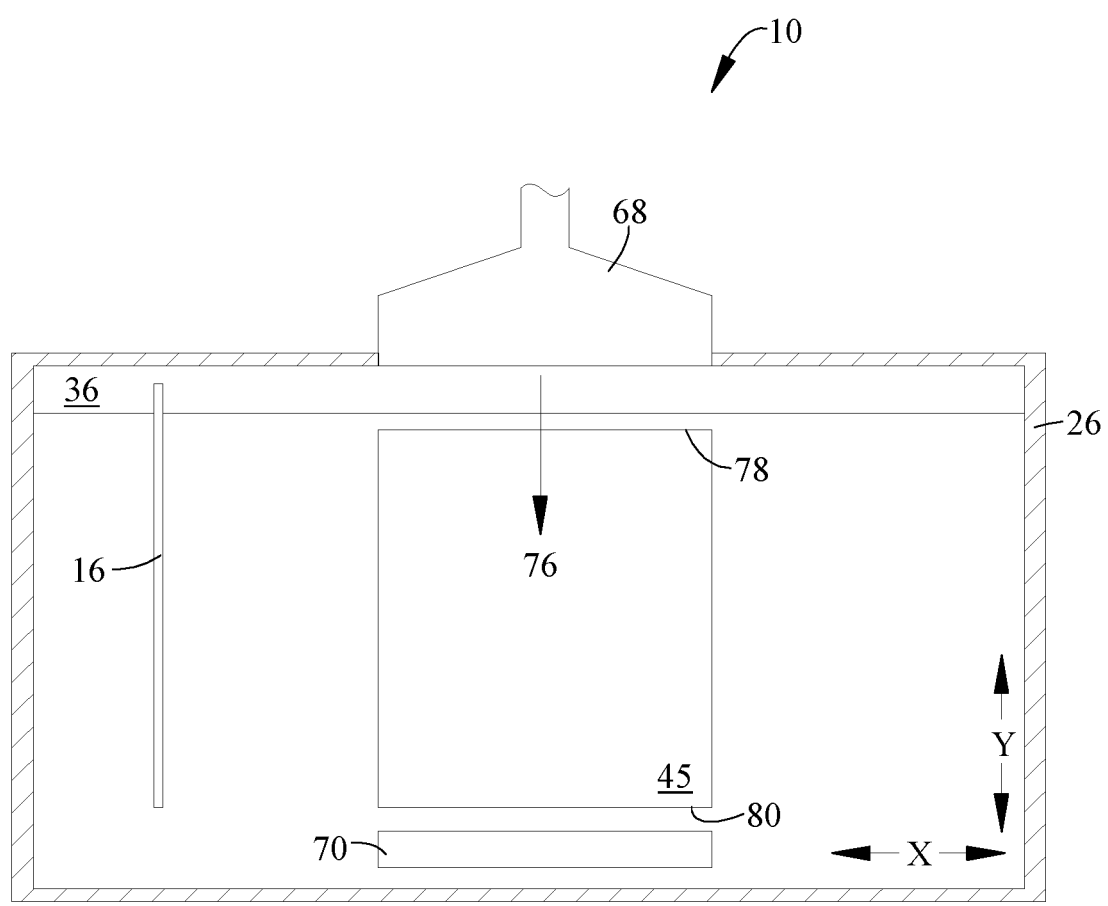
FIG. 3 is a schematic, partially-sectioned top plan view of the machine of FIG. 1.

The inlet duct 68 is positioned near the bottom of the housing 26. During operation it provides a stream or flow of gas (see arrow 76). As seen in FIG. 1, the inlet duct 68 has an elongated shape (for example rectangular) and discharges gas across the width of the build chamber 22. For reference purposes the width of the build chamber 22 may be considered parallel to the "X" direction. As shown in FIG. 3, the edge of the build chamber 22 closest to the upper inlet duct 68 is referred to as a "leading edge" 78, and the opposite parallel edge is referred to as a "trailing edge" 80. For reference purposes the length of the build chamber (i.e. distance from leading edge 78 to trailing edge 80) may be considered parallel to the "Y" direction.

The gas flow 76 has two functions. First, it is used to effect heat transfer and carry heat away from the surface of the uppermost built layer within the build chamber 22. Second, during the build process, some of the powder 44 is vaporized. This vapor can cool and condense on the surface of the workpiece 25, in turn causing an undesirable surface roughness or "recast" layer. Part of the gas flow 76 is used to carry away the vapors and/or condensate.

Figure 4:
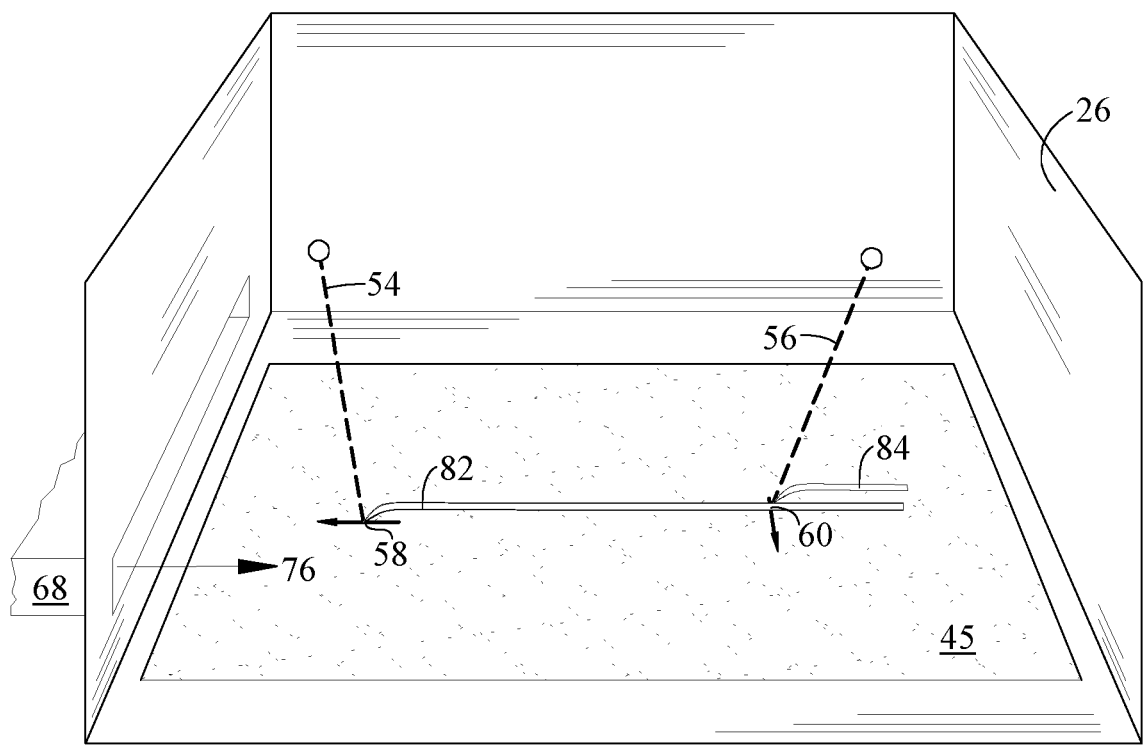
FIG. 4 is a schematic perspective view of an additive manufacturing build chamber showing a build process using two energy beams.

In operation, the interaction of the build beams 54, 56 with the powder 44 causes heating and vaporization of the powder 44. As shown in FIG. 4, this generates first and second "plumes" 82, 84 respectively which originate in the vicinity of the melt pools 58, 60 and travel downstream, entrained in the gas flow 76. In the immediate vicinity of the melt pools 58, 60 the composition of the plumes 82, 84 respectively is mostly vaporized powder. At downstream locations, the vapor can cool and condense so that the plumes 82, 84 comprise a mixture of gas and metallic particles.

To enable the monitoring techniques described below, it is desirable to quantify the behavior of the plumes 82, 84. In particular, it is desirable to create a "plume map" describing the location and dimensions of each plume 82, 84 in 3-D space for any given time, and the propagation of the plumes 82, 84 over time. This process may also be described as determining the trajectory of the plumes 82, 84. For the purposes of convenient description, plume 82 will be used as an example with the understanding that the same methods may be used for plume 84 or for any additional plume, where multiple energy beams are used.

One possible method for creating a map of the plume 82 involves sensing the plume 82. Any visualization technique capable of distinguishing the plume 82 from the gas flow 76 may be used for this purpose.

For example, an illumination source may be provided to illuminate the plume 82 in concert with one or more sensors to detect light scattered or reflected from the plume 82. Nonlimiting examples of suitable illumination sources include: a laser operated at a low output wattage (such as the beam generators 24); one or more additional dedicated low-power lasers or other energy beams (shown schematically at 85 in FIG. 5), a supplementary light-emitting diode ("LED"), or a chamber light in an appropriate wavelength (e.g. infrared or visible). Both backscatter and forward scatter sensing techniques may be used, and multiple images from multiple sensors may be combined to generate a 3-D plume map.

Figure 5:
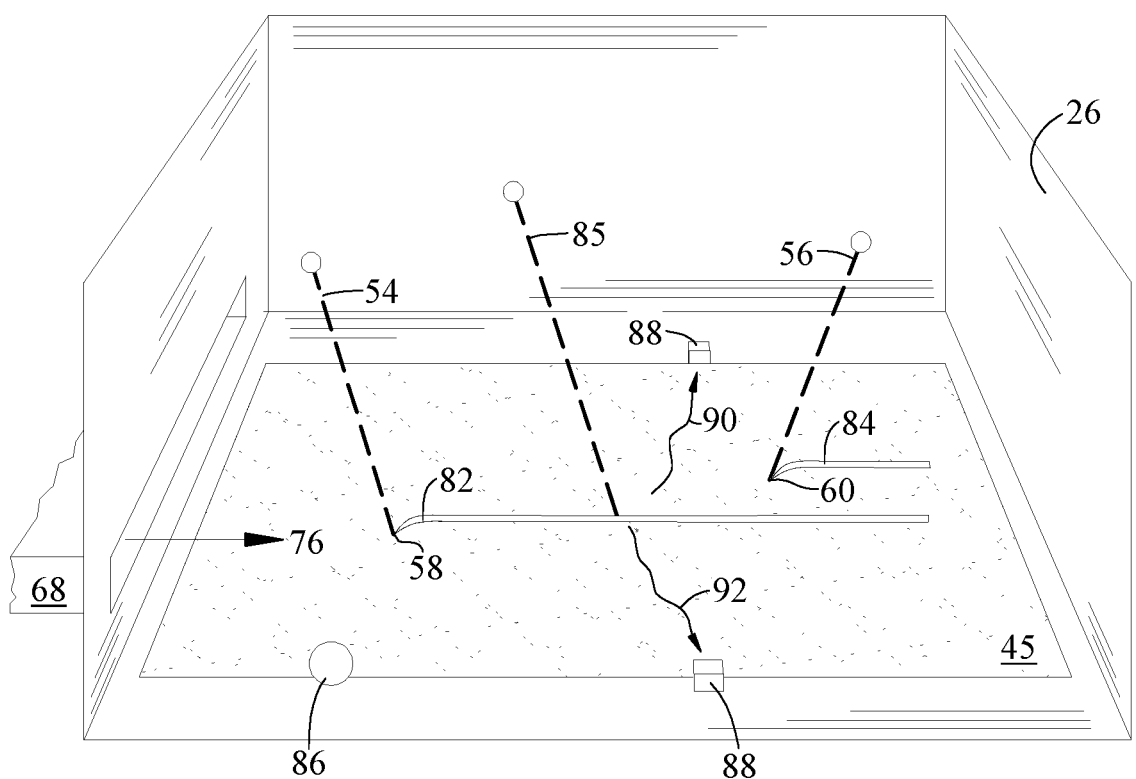
FIG. 5 is a schematic perspective view of an additive manufacturing build chamber showing a build process using two energy beams, an illumination source, and sensors positioned around the build chamber to detect plumes generated by the beams.

In the example shown in FIG. 5, an illumination source 86 (shown schematically) is provided at a fixed location within the housing 26. Sensors 88 are provided within the housing 26 with a clear field of view of the build surface 45. Each sensor 88 is sensitive to forward scattered light 90 or backward scattered light 92. Alternatively or in addition to the illumination source 86, a low-power energy beam 85 may be used to provide a source of light scattered from the plume 82. As used herein, the term "low-power" refers to a beam intensity which is sufficient to produce a detectable scattered light signal but does not cause significant melting or fusing of the powder 44. If a low-power energy beam 85 is used, it may be scanned across the build surface 45 in a fixed pattern, or it may be scanned in a method so as to track a predicted location of the plume 82.

The sensors 88 are of a type and configured such that they can detect the forward scattered or backward scattered light 90, 92 and in response produce a signal representative of the position of the plume 82. For example, they may be imaging sensors, or a plurality of simpler sensors arranged in an X-Y array may be provided in order to provide positional reference. The pattern of signals from the sensors 88 is indicative of the location of the plume 82.

The sensors 88 may be used to generate a plume map in real time as the build process proceeds. The information provided by the sensors 88 is useful in improving the performance and efficiency of the machine 10.

For example, the plume map may be used to initially establish an adequate process capability for the machine 10. Upon initial machine set up, a test build would be performed using a nominal set of operating parameters. The sensors 88 would be used to create a plume map as described above. The plume maps would then be analyzed, compared to predetermined performance limits, and/or compared to a specified trajectory, thereby confirming that the plume trajectory meets acceptable performance requirements and/or adheres to a predicted behavior. The plume maps generated during initial machine runs may be stored for future reference.

If the plume maps indicate unsatisfactory behavior, changes could be made to one or more process parameters to manipulate the plume behavior. The sensors 88 could be used again in a subsequent build to determine the effectiveness of the changes. A series of iterations may be performed until the plume performance meets operational requirements. Once this set of iterations is complete, subsequent builds could be performed in an open loop fashion, using the optimized set of operating parameters.

In establishing the initial process capability, it may be useful to characterize the plume 82 by modeling the plume 82. This may be done for example, using a commercially available computational fluid dynamics ("CFD") software package. The inputs to the software include, but are not limited to, the aerodynamic and thermal characteristics of the shielding gas flow 76 and the aerodynamic and thermal characteristics of the plume generation and propagation process. The inputs may take into consideration factors such as: air flow rates, energy beam wavelength, intensity, or focus, consolidated or unconsolidated powder material composition and physical characteristics, melt pool dimensions and thermal characteristics, the type of fusing process (e.g. heating, melting, or sintering), and the composition of the plume (e.g. gases/and/or metal alloys). The CFD software is then capable of producing as an output a plume map.

The plume map produced by the sensors 88 may be compared to the modeled plume map.

Once the initial machine capability is established as described above, the stored plume maps can serve as a baseline for a trend monitoring process. Generally stated, the monitoring process includes using the sensors 88 to monitor the plume 82 and then adjust one or more process parameters as necessary. As used herein, "process parameters" can refer to any controllable aspect of the machine 10 and/or the gas flow apparatus 62.

The monitoring method may include establishing one or more predetermined limits for the plume behavior, such as a maximum permissible deviation from a baseline trajectory. These may be referred to as "plume trajectory limits".

The monitoring method may include taking a discrete action in response to one or more plume trajectory limits being exceeded, such as providing a visual or audible alarm to a local or remote operator.

The monitoring method may include stopping the build process in response to one or more plume trajectory limits being exceeded. This is another example of a discrete action.

The monitoring method may include real-time control of one or more process parameters using method such as: statistical process control, feedforward control, feedback control using proportional, proportional-integral, or proportional-integral-derivative control logic, neural network control algorithms, or fuzzy logic control algorithms.

The monitoring method may include monitoring of the condition or "health" of the machine 10 and/or the gas flow apparatus 62. Plume trajectory measurements may be measured and stored during several build cycles and compared between cycles. For example, changing trajectories could indicate clogging of filter 66, or blockage in a portion of the inlet duct 68. Corrective action could take the form of machine maintenance or repairs, or modification of process parameters in subsequent builds to compensate for machine degradation.

The operation of the apparatus described above including the machine 10 and gas flow apparatus 62 may be controlled, for example, by software running on one or more processors embodied in one or more devices such as a programmable logic controller ("PLC") or a microcomputer (not shown). Such processors may be coupled to the sensors and operating components, for example, through wired or wireless connections. The same processor or processors may be used to retrieve and analyze sensor data, for statistical analysis, and for feedback control.

The method described herein has several advantages over the prior art. In particular, it provides a detailed understanding of the emissions plumes in an additive manufacturing process. This detailed understanding will enable build strategies that avoid beam/plume interactions, optimize build speed, and/or monitor machine future behavior vs. documented baseline for trends and exceptions.

The foregoing has described an apparatus and method for emissions plume monitoring in an additive manufacturing process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method of monitoring an additive manufacturing process in which one or more energy beams are used to selectively fuse a powder to form a workpiece, in a presence of one or more plumes generated by interaction of the one or more energy beams with the powder, the method comprising using at least one sensor to generate at least one signal representative of a trajectory of the one or more plumes and generating a real-time plume map from the at least one signal generated by the at least one sensor.

2. The method of claim 1 further comprising using an illumination source to radiate light that is then scattered or reflected from at least one of the one or more plumes to the at least one sensor.

3. The method of claim 2 wherein the illumination source comprises a low-power energy beam.

4. The method of claim 1 wherein:
the powder defines a build surface; and
an array of sensors is provided surrounding the build surface.

5. The method of claim 1 further comprising using the at least one signal generated by the at least one sensor to define a baseline performance of the additive manufacturing process.

6. The method of claim 1, further comprising:
predicting a trajectory of the one or more plumes by software modeling; and
comparing the at least one signal generated by the at least one sensor to the predicted trajectory.

7. A method of monitoring an additive manufacturing process in which one or more energy beams are used to selectively fuse a powder to form a workpiece, in a presence of one or more plumes generated by interaction of the one or more energy beams with the powder, the method comprising:
using at least one sensor to generate at least one signal representative of a trajectory of the one or more plumes;
using the at least one signal generated by the at least one sensor to define a baseline performance of the additive manufacturing process;
repeating the additive manufacturing process to build a subsequent workpiece;
during the build of the subsequent workpiece, using the at least one sensor to generate at least one signal representative of a trajectory of the one or more plumes; and
comparing the at least one signal generated during the subsequent build to the baseline performance.

8. The method of claim 1 further comprising taking a discrete action in response to the at least one signal exceeding one or more predetermined plume trajectory limits.

9. The method of claim 8 wherein the one or more predetermined plume trajectory limits includes a maximum deviation from a predetermined plume trajectory.

10. The method of claim 1 further comprising changing at least one process parameter of the additive manufacturing process in response to the at least one signal generated by the at least one sensor.

11. A method of making a workpiece, comprising:
depositing a powder in a build chamber disposed in a housing, while using a gas flow apparatus coupled in fluid communication with the housing to provide a gas flow over the powder;
in a presence of the gas flow, directing one or more energy beams to selectively fuse the powder in a pattern corresponding to a cross-sectional layer of the workpiece, wherein interaction of the one or more energy beams with the powder generates one or more plumes entrained in the gas flow;
using at least one sensor to generate at least one signal representative of a trajectory of the one or more plumes and generating a plume map from the at least one signal;
predicting a trajectory of the one or more plumes by software modeling and comparing the predicted trajectory to the plume map generated from the at least one signal; and
controlling at least one aspect of an additive manufacturing process in response to the at least one signal.

12. The method of claim 11 further comprising using an illumination source to radiate light that is then scattered or reflected from at least one of the one or more plumes to the at least one sensor.

13. The method of claim 12 wherein the illumination source comprises a low-power energy beam.

14. The method of claim 11 wherein:
the powder defines a build surface; and
an array of sensors is provided surrounding the build surface.

15. The method of claim 11 further comprising using the at least one signal generated by the at least one sensor to define a baseline performance of the additive manufacturing process.

16. The method of claim 11 further comprising:
repeating the additive manufacturing process to build a subsequent workpiece;
during the build of the subsequent workpiece, using the at least one sensor to generate at least one signal representative of a trajectory of the one or more plumes; and
comparing the at least one signal generated during the subsequent build to the baseline performance.

17. The method of claim 11 further comprising changing at least one process parameter of the additive manufacturing process in response to the at least one signal generated by the at least one sensor.

* * * * *